United States Patent
Nagashima (10) Patent No.: US 8,024,150 B2
(45) Date of Patent: Sep. 20, 2011

(54) INFORMATION EQUIPMENT FOR DETECTING FALL

(75) Inventor: Fumio Nagashima, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 50 days.

(21) Appl. No.: 12/362,910

(22) Filed: Jan. 30, 2009

(65) Prior Publication Data

US 2009/0287449 A1    Nov. 19, 2009

(30) Foreign Application Priority Data

May 15, 2008    (JP) .................... 2008-128464

(51) Int. Cl.
*G01P 15/00*    (2006.01)

(52) U.S. Cl. ........................................ 702/141

(58) Field of Classification Search .......... 702/41, 702/66, 71, 141, 150, 173; 73/488, 489, 73/492; 324/162
See application file for complete search history.

(56) References Cited

U.S. PATENT DOCUMENTS

| | | | |
|---|---|---|---|
| 6,570,726 B2 * | 5/2003 | Mutoh | 360/60 |
| 7,359,143 B2 | 4/2008 | Murakami | |
| 7,617,069 B2 * | 11/2009 | Alexander et al. | 702/141 |
| 2005/0193820 A1 * | 9/2005 | Sheljaskow et al. | 73/649 |
| 2005/0279165 A1 * | 12/2005 | Yuasa | 73/489 |
| 2006/0070439 A1 * | 4/2006 | Kwon et al. | 73/488 |
| 2006/0116848 A1 * | 6/2006 | Clifford et al. | 702/141 |
| 2006/0192658 A1 * | 8/2006 | Yamamura | 340/425.5 |
| 2006/0236761 A1 * | 10/2006 | Inoue et al. | 73/510 |
| 2007/0030587 A1 * | 2/2007 | Noda et al. | 360/75 |
| 2009/0031808 A1 * | 2/2009 | Kawahara | 73/510 |

FOREIGN PATENT DOCUMENTS

| | | |
|---|---|---|
| JP | 2003-219061 | 7/2003 |
| JP | 2006-199204 | 8/2006 |
| JP | 2006-269015 | 10/2006 |

* cited by examiner

*Primary Examiner* — Michael Nghiem
(74) *Attorney, Agent, or Firm* — Fujitsu Patent Center (57) ABSTRACT

Acceleration is detected by an acceleration sensor in information equipment and information of detected acceleration is compared with a threshold value. Then, if the information of the detected acceleration is equal to or less than the threshold value, it is determined that the information equipment is in a weightless condition.

5 Claims, 14 Drawing Sheets

INFORMATION EQUIPMENT FOR DETECTING FALL

CROSS-REFERENCE TO RELATED APPLICATIONS

This application is based upon and claims the benefit of priority of the prior Japanese Patent Application No. 2008-128464, filed on May 15, 2008, the entire contents of which are incorporated herein by reference.

FIELD

The embodiments discussed herein are related to information equipment with a function to detect fall.

BACKGROUND

Portable information equipment, such as a cell phone, a portable music player, a digital camera, a notebook personal computer and the like always has a possibility of falling from a human hand, colliding against the ground and being broken. Such a careless break usually is no target of guaranty by a maker.

As portable information equipment whose shock can be detected, a cell phone provided with an acceleration sensor and a microphone is known. A drive recorder that can recognize the existence of accident occurrence and a cartridge fall detection device in a magnetic tape library device are also known.

Patent document 1: Japanese Laid-open Patent Publication No. 2003-219061
Patent document 2: Japanese Laid-open Patent Publication No. 2006-199204
Patent document 3: Japanese Laid-open Patent Publication No. 2006-269015

SUMMARY

According to an aspect of the invention, an information equipment includes an acceleration sensor for detecting acceleration, a storage device for storing information of detected acceleration and a process device. The process device compares the information of the detected acceleration with a threshold value, determines that the information equipment is in a weightless condition if the information of the detected acceleration is equal to or less than the threshold value and records a determination result in the storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When an acceleration sensor is used to detect the fall of portable information equipment, there are the following problems.

Figure 8:
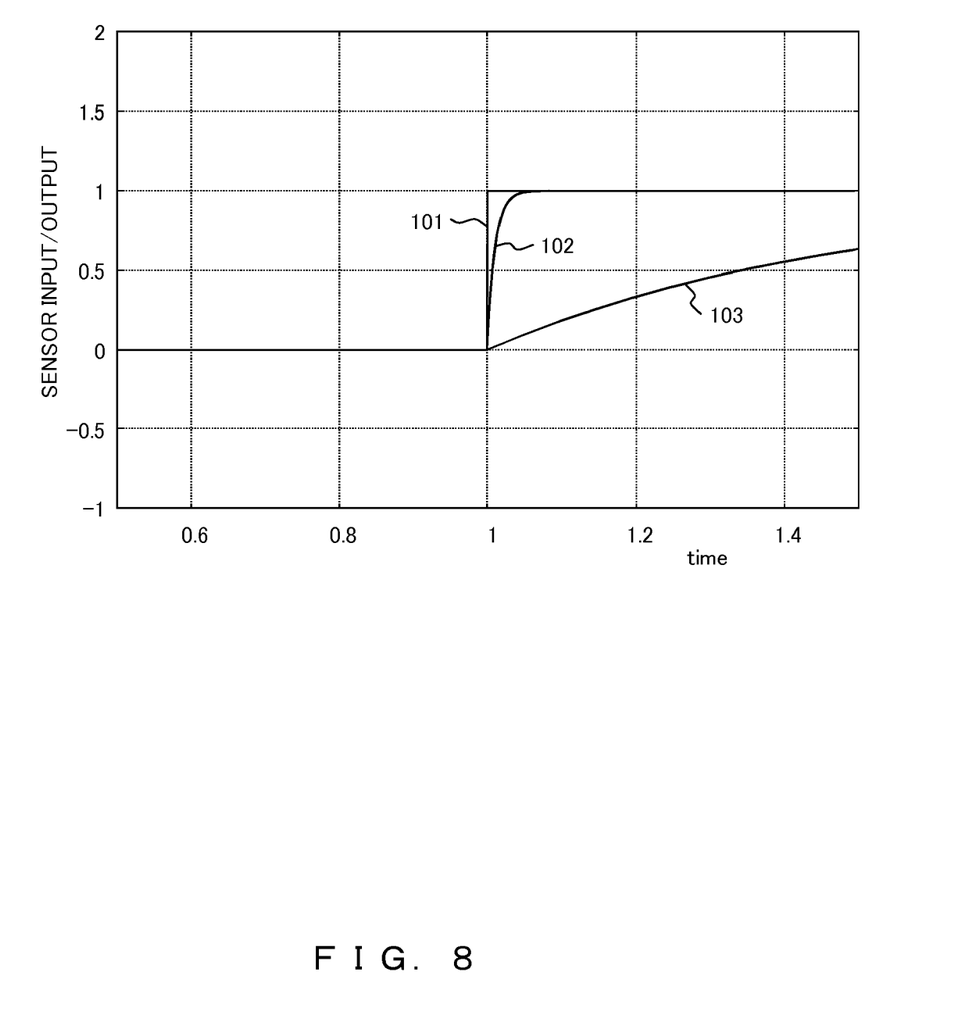
FIG. 8 illustrates the time change of sensor input/output.

Generally, acceleration sensors are roughly classified into two types of a highly frequency-responsive sensor and a low frequency-responsive sensor. The time change of the input/output of these acceleration sensors is, for example, as illustrated in FIG. 8. When a stepped input signal 101 is inputted, the highly frequency-responsive sensor outputs an output signal 102 and the low frequency-responsive sensor outputs an output signal 103. Thus, the low frequency-responsive sensor does not follow the input signal 101.

Figure 9:
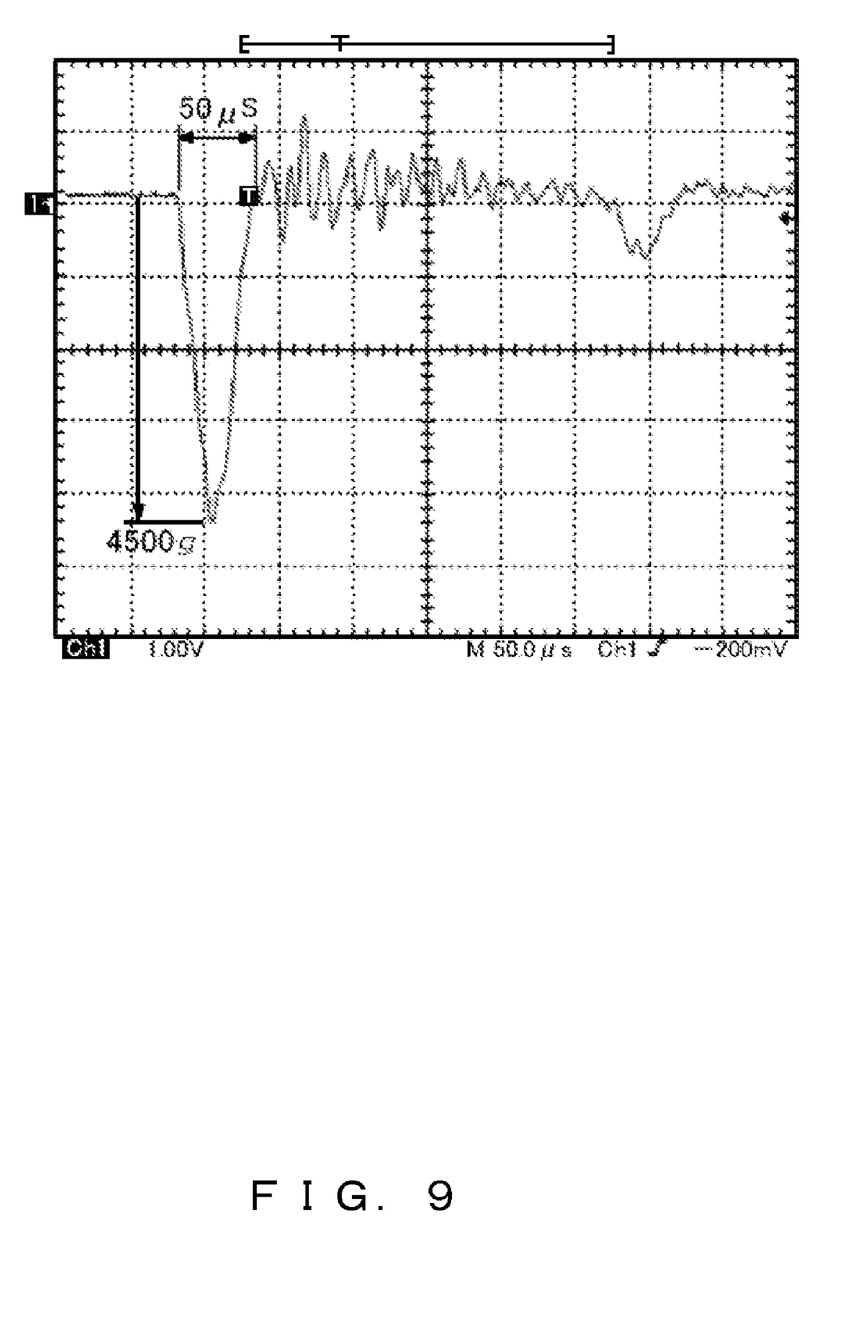
FIG. 9 illustrates an acceleration signal in a mechanical component fall test.

FIG. 9 illustrates an example of an acceleration signal in a general mechanical component fall test. The horizontal and vertical axes indicate time (50 μs/div.) and acceleration (1000 g/div.), respectively. g is gravity acceleration. According to the result of this test, the acceleration of fall shock is approximately 4,500 g and continued shock time is approximately 50 μs. Therefore, sampling time sufficient to detect fall shock is 25 μs and a sampling frequency at that time is 40 kHz.

Figure 10:
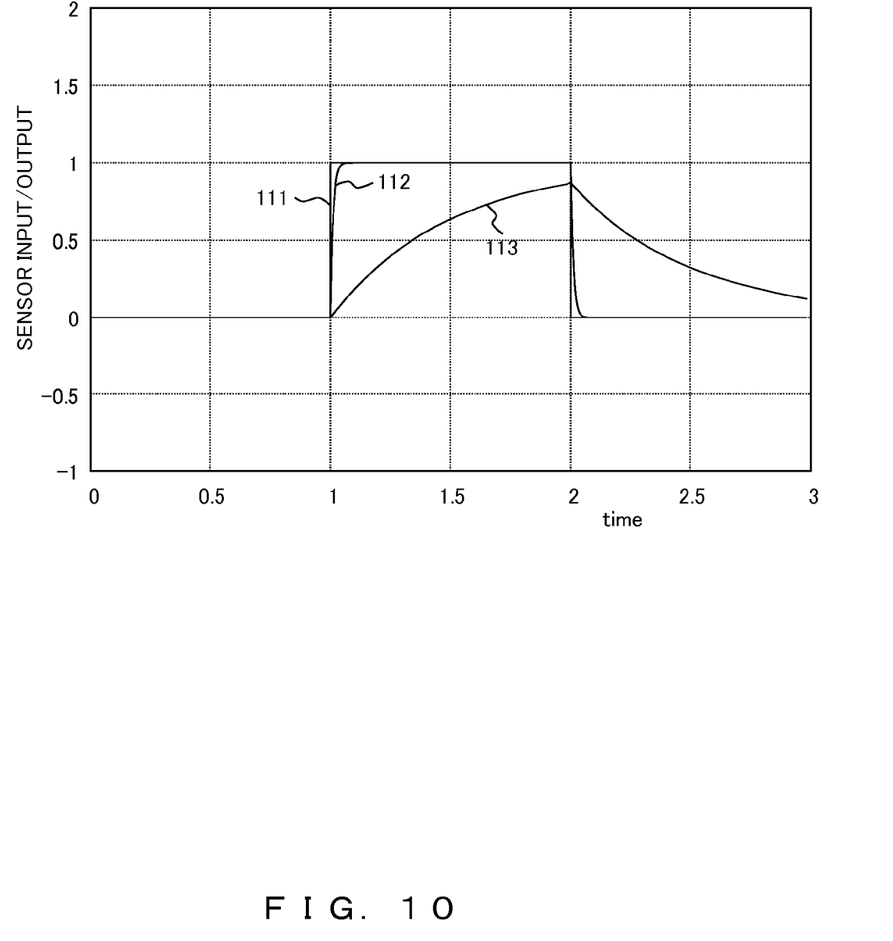
FIG. 10 illustrates the sensor input/output of an impact-like signal.

FIG. 10 illustrates the time change of the input/output of an acceleration sensor when an impact-like signal is inputted to the acceleration sensor. When a rectangular wave input signal 111 is inputted, highly and low frequency-responsive sensors output output signals 112 and 113, respectively. Whereas the information of the rectangular wave is somewhat maintained in the output signal 112, the information of the rectangular wave is lost in the output signal 113.

Figure 11:
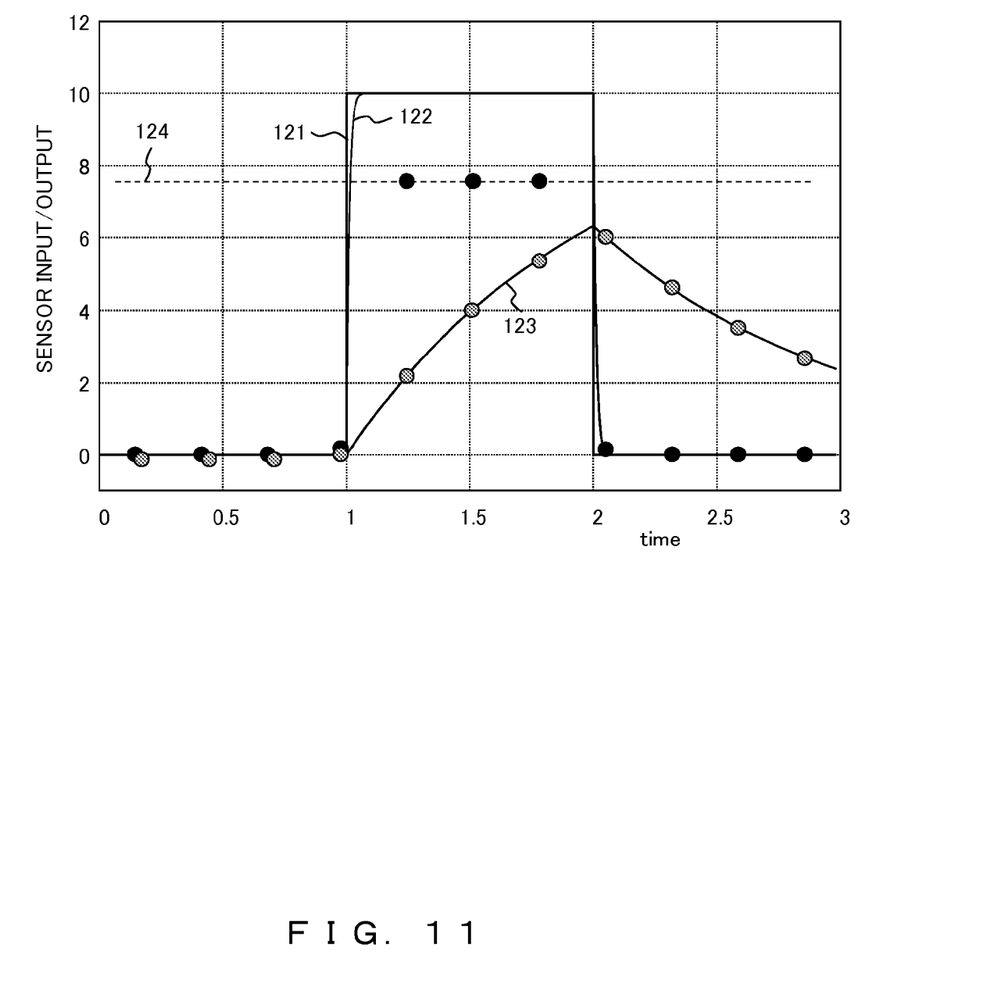
FIG. 11 illustrates a measurement limit.

FIG. 11 illustrates the time change of the input/output of an acceleration sensor when a signal exceeding the measurement limit is inputted. When such a high rectangular wave input signal as to exceed a measurement limit value 124 is inputted, a low frequency-responsive sensor outputs a lower output signal than the measurement limit value 124. A highly frequency-responsive sensor theoretically outputs the output signal 122. However, actually, the output signal value of a part exceeding the measurement limit value 124 stays at the same value as the measurement limit value 124.

As such a highly frequency-responsive sensor, there is a piezoelectric device sensor, and as such a low frequency-responsive sensor, there is a MEMS (micro-electro-mechanical systems) sensor.

Figure 12:
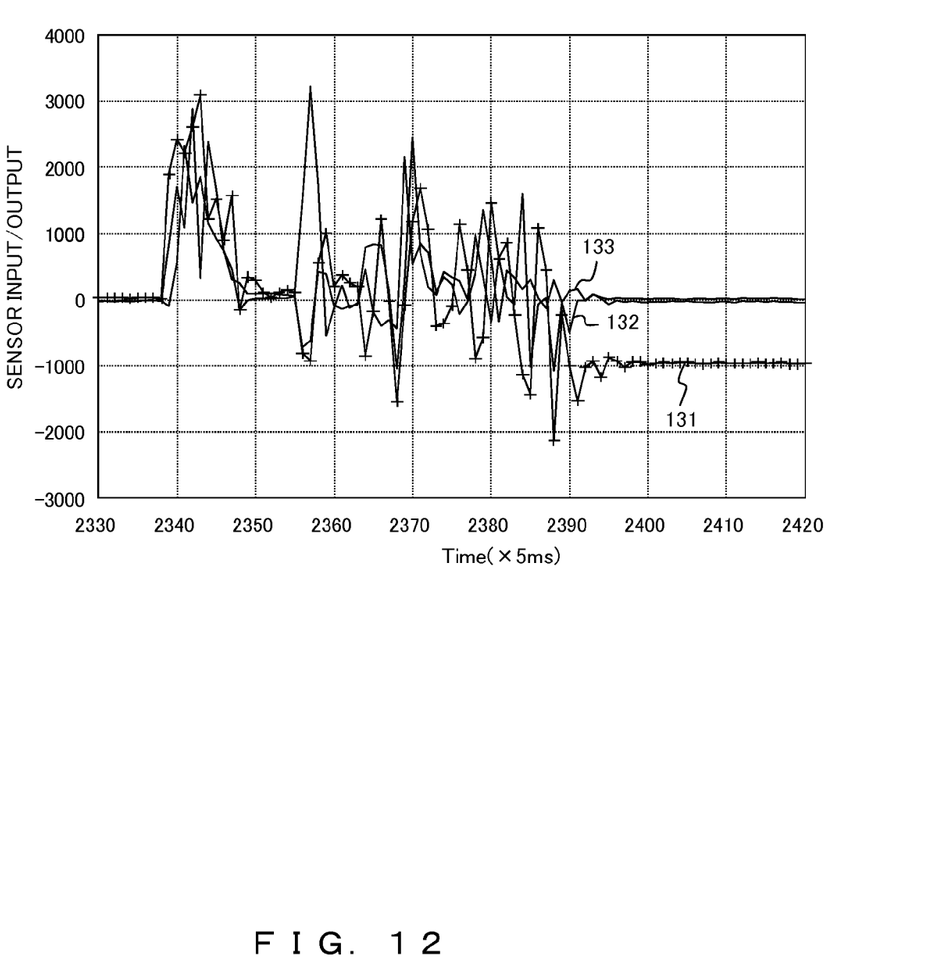
FIG. 12 illustrates the output of a MEMS sensor.
Figure 13:
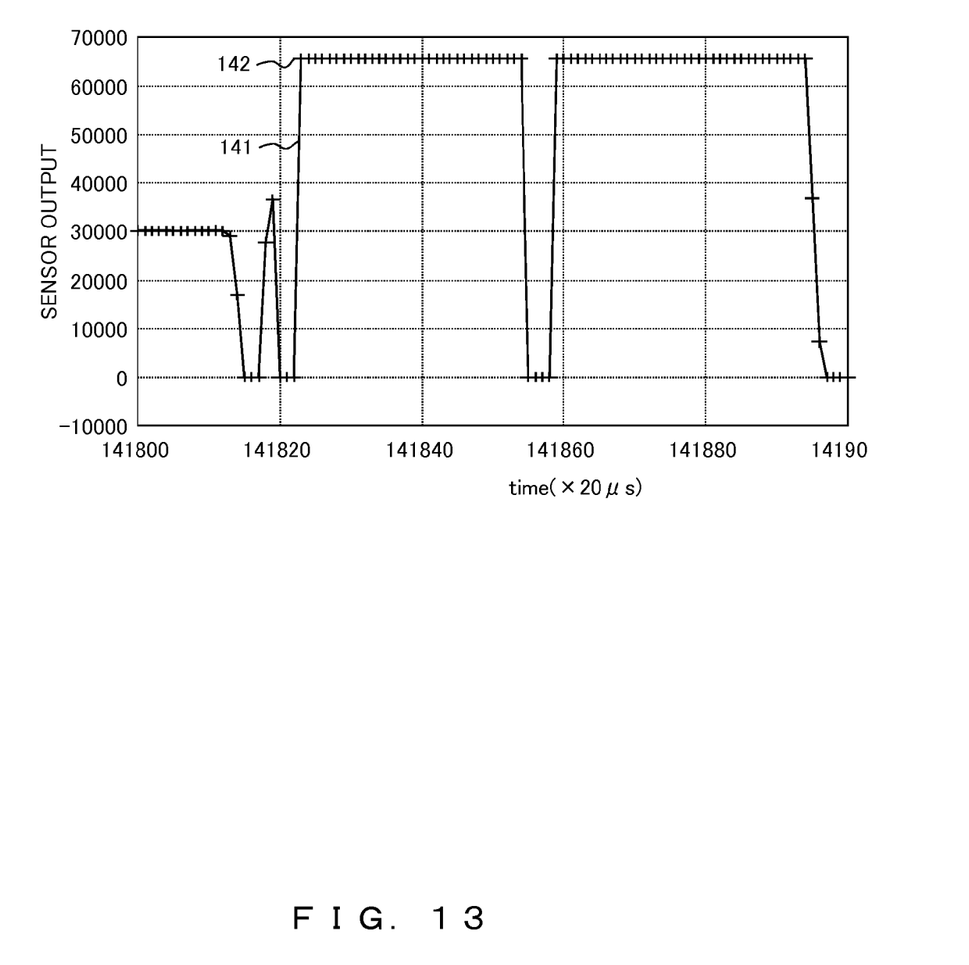
FIG. 13 illustrates the output of a piezo-electric device sensor.

FIGS. 12 and 13 show the results of fall collision experiment using a piezoelectric device sensor and a MEMS sensor. In this experiment, after a monoaxial piezoelectric device sensor and a triaxial MEMS sensors are mounted on an experimental device representing portable information equipment, the portable information equipment is dropped from a position 10 cm above the floor and is made to collide with the floor. The measurement limit value (a maximum acceleration) and an upper-limit responsive frequency of each sensor are as follows.

(1) Piezo-electric device sensor
Maximum acceleration: ±100 g
Upper-limit responsive frequency: 25 kHz (2) MEMS sensor
Maximum acceleration: ±3 g
Upper-limit responsive frequency: 500 Hz FIG. 12 illustrates the time change of the output of the MEMS sensor mounted on the portable information equipment. Since the frequency response of the MEMS sensor is low, after its collision with the floor, all of the output signal 131 of the z axis corresponding to the vertical direction, the output signal 132 of the x axis and the output signal 133 of the y axis indicate waveforms in which a local maximum and a local minimum appear alternately. Then, a certain time after the collision, the output signal 131 in the vertical direction converges on an output value corresponding to the gravity acceleration and the output signals 132 and 133 in the horizontal directions converge on an output value 0.

FIG. 13 illustrates the time change of the output of the piezo-electric device sensor mounted on the portable information equipment together with the MEMS sensor. Since the frequency response of the piezoelectric device sensor is high, immediately after the collision with the floor, an output signal 141 in the vertical direction is fixed to the measurement limit value 142. In this case, acceleration at the time of collision can be estimated by the parabolic approximation illustrated in FIG. 14.

Figure 14:
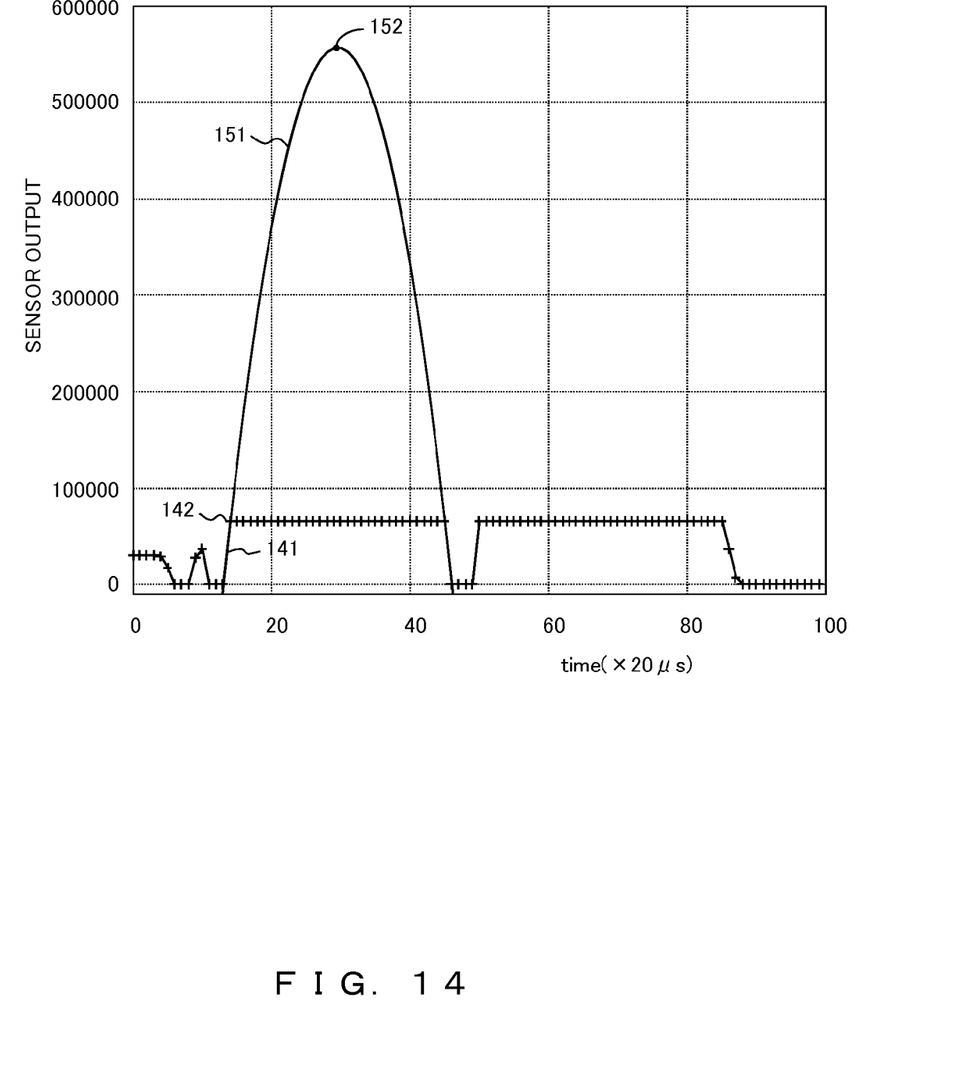
FIG. 14 illustrates a parabolic approximation.

In FIG. 14, the origin of time is shifted from that illustrated in FIG. 12. In this parabolic approximation, a sensor output value at the peak 152 of a parabola 151 including the output signal 141 is obtained as a local maximum. In this example, an estimated acceleration corresponding to the local maximum is 1601.6 g. This estimated acceleration is near acceleration 1400 g obtained from the theoretical value of velocity at the time of collision, which indicates that parabolic approximation is fairly useful.

According to the above experimental result, by using a highly frequency-responsive piezo-electric device sensor, acceleration at the time of collision can be estimated with fairly high accuracy. When only a MEMS sensor is used, however, acceleration at the time of collision is not estimated. Such a problem occurs not only when a MEMS sensor is used but also when another type of low frequency-responsive sensor is used. However, since a piezo-electric device sensor is far more expensive than a MEMS sensor and its consumption current is large, under the present conditions, the piezo-electric device sensor does not suit to be mounted on portable information equipment.

The preferred embodiments of the present invention will be explained with reference to accompanying drawings.

Figure 1:
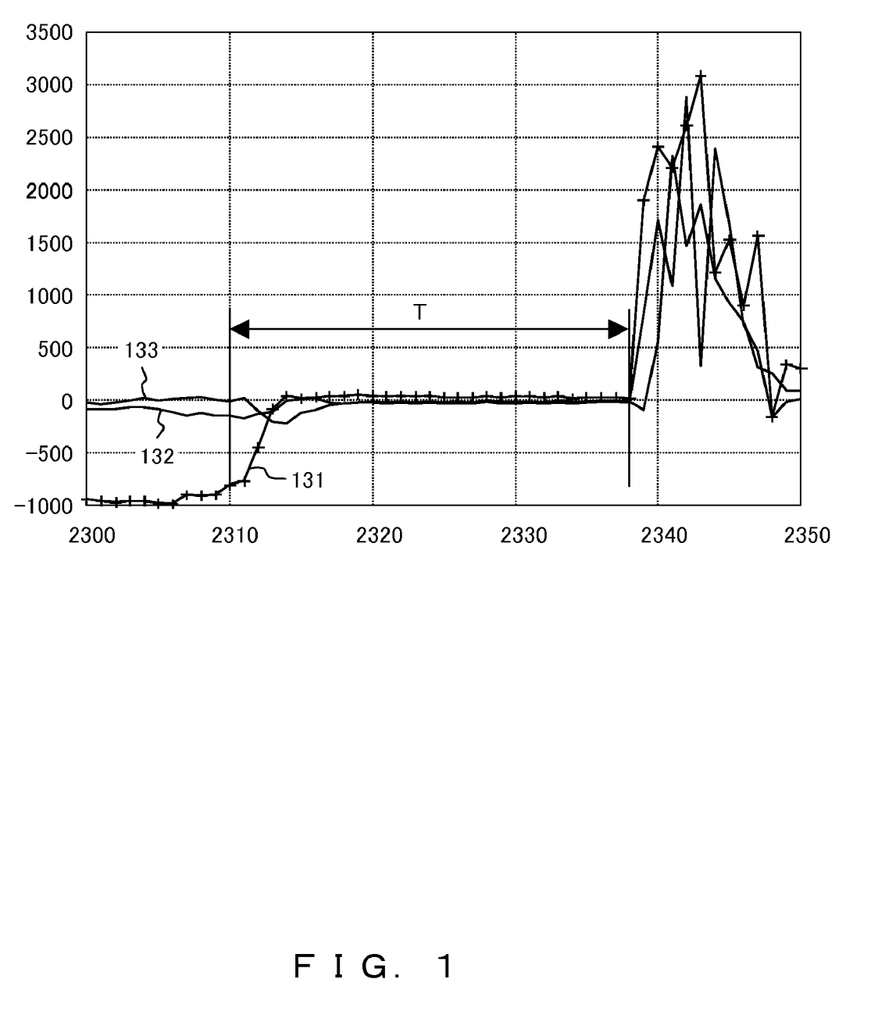
FIG. 1 illustrates a weightless condition time.

FIG. 1 illustrates the output of a MEMS sensor before collision in the experimental result illustrated in FIG. 12. Time T until the portable information equipment collides with the floor after it starts falling corresponds to a weightless condition time and all the output signals 131 through 133 of the MEMS sensor during this period indicate values around 0. In other words, in the weightless condition time T, the portable information equipment is in the state of acceleration 0.

Although the output signals 132 and 133 in the horizontal directions before falling indicate values around 0 as in the weightless condition time T, only the output signal 131 indicates an output value corresponding to gravity acceleration. Therefore, by monitoring the time change of this output signal 131, the weightless condition time T can be identified and it is learned that the portable information equipment has been in the weightless condition for a certain time.

Although in the examples illustrated in FIGS. 1 and 12, the z axis of the MEMS sensor corresponds to a vertical direction, actually it is unknown in what posture portable information equipment falls. Therefore, depending on posture at the time of falling, there is a possibility that the output signals of the x and y axes may change.

Figure 2:
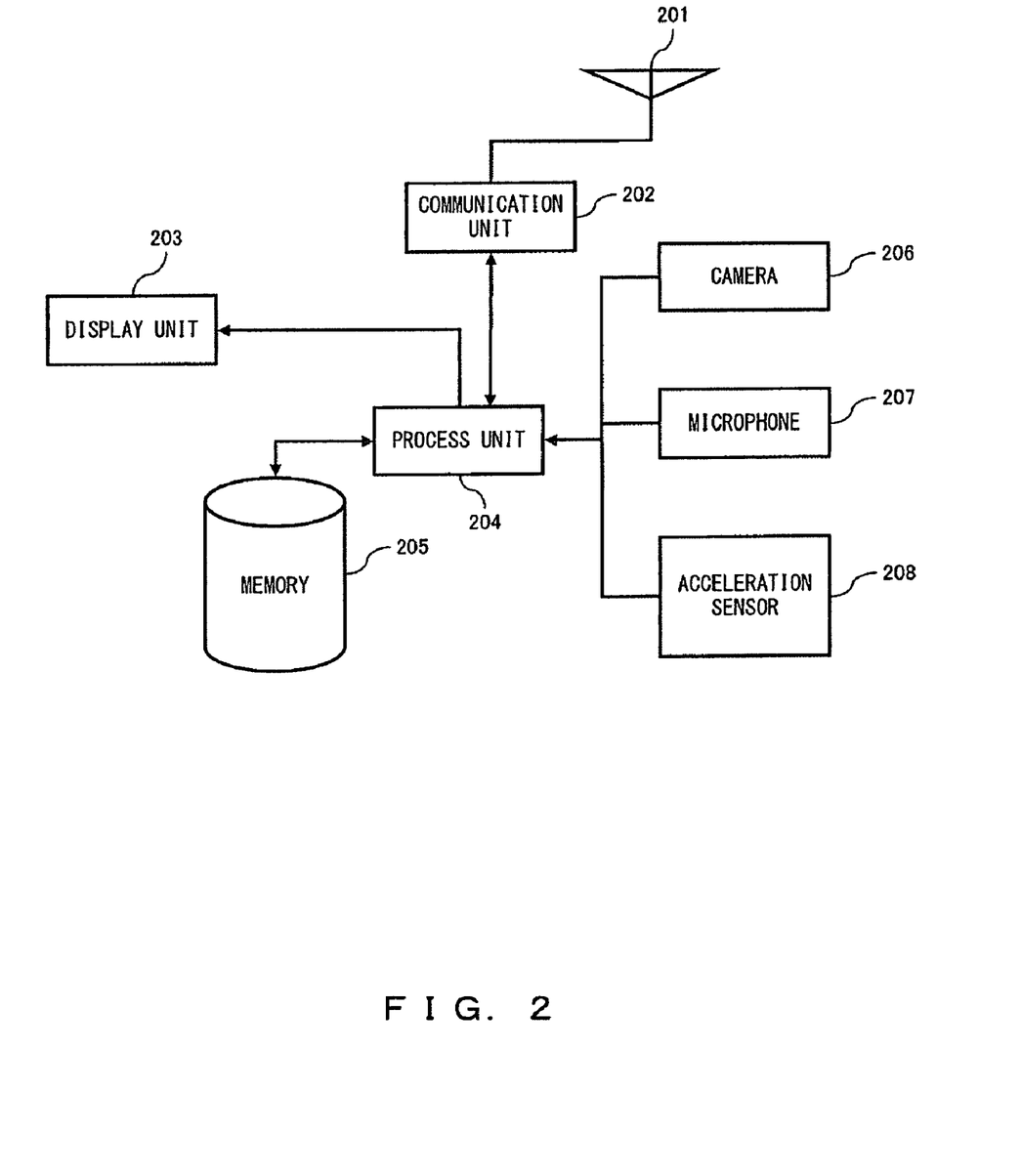
FIG. 2 illustrates the configuration of portable information equipment.

FIG. 2 illustrates the configuration of portable information equipment for detecting its fall by detecting such a weightless condition. The portable information equipment includes an antenna 201, a communication unit 202, a display unit 203, a process unit 204, a memory 205, a camera 206, a microphone 207 and a triaxial acceleration sensor 208.

The communication unit 202 conducts radio communications with a communication device, such as a base station device via the antenna 201. The camera 206 and the microphone 207 obtain image information and audio information, respectively, and transfer them to the process unit 204. The acceleration sensor 208 detects acceleration and outputs a signal corresponding to the acceleration to the process unit 204.

The process unit 204 performs an information process on the basis of information obtained from the communication unit 202, the camera 206, the microphone 207 and the acceleration sensor 208 and stores its process result in the memory 205. In this case, the output signal of the acceleration sensor 208 is converted to an acceleration value and is stored in the memory 205. Furthermore, the process unit 204 displays the information stored in the memory 205 on the screen of the display unit 203 and/or outputs it to the communication unit 202.

The fall detection process by the portable information equipment illustrated in FIG. 2 is described with reference to FIGS. 3 through 7. The following fall detection process is repeated regularly or at specified timing.

Figure 3:
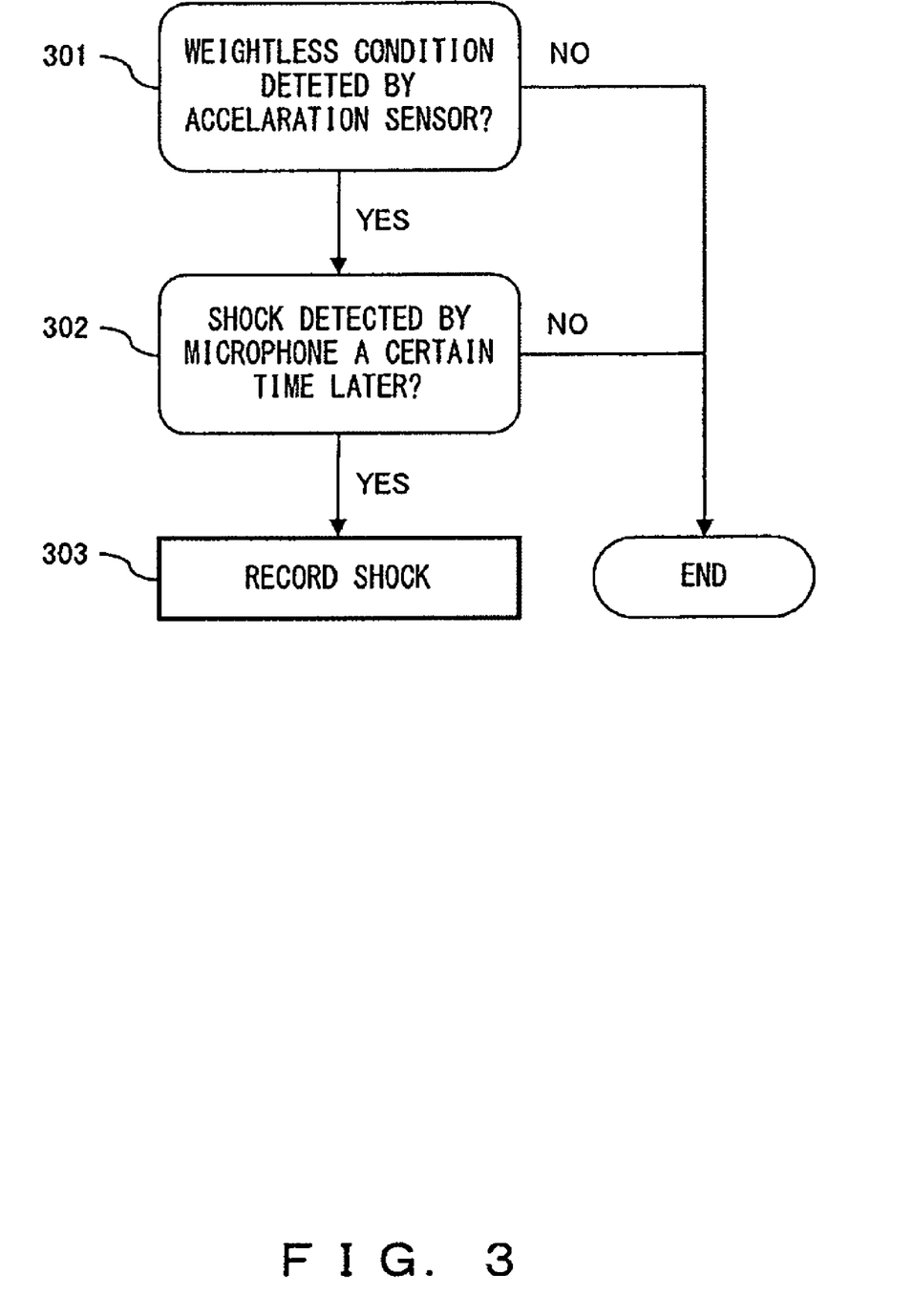
FIG. 3 is the flowchart of the first fall detection process.

FIG. 3 is the flowchart of the first fall detection process using the microphone 207 and the acceleration sensor 208. When adopting the first fall detection process, there is no need for portable information equipment to include the camera 206. Firstly, the process unit 204 determines whether a weightless condition has been detected, on the basis of the output signal of the acceleration sensor 208 (step 301). If no weightless condition has been detected, the process is terminated.

If the weightless condition has been detected, the microphone 207 is activated and it is determined whether shock has been detected, on the basis of its audio information (step 302). If no shock has been detected, the process is terminated. If shock has been detected, its shock detection information is recorded on the memory 205 (step 303). As the shock detection information, for example, an acceleration value for each measurement time in a range including the weightless condition time T is recorded.

Figure 4:
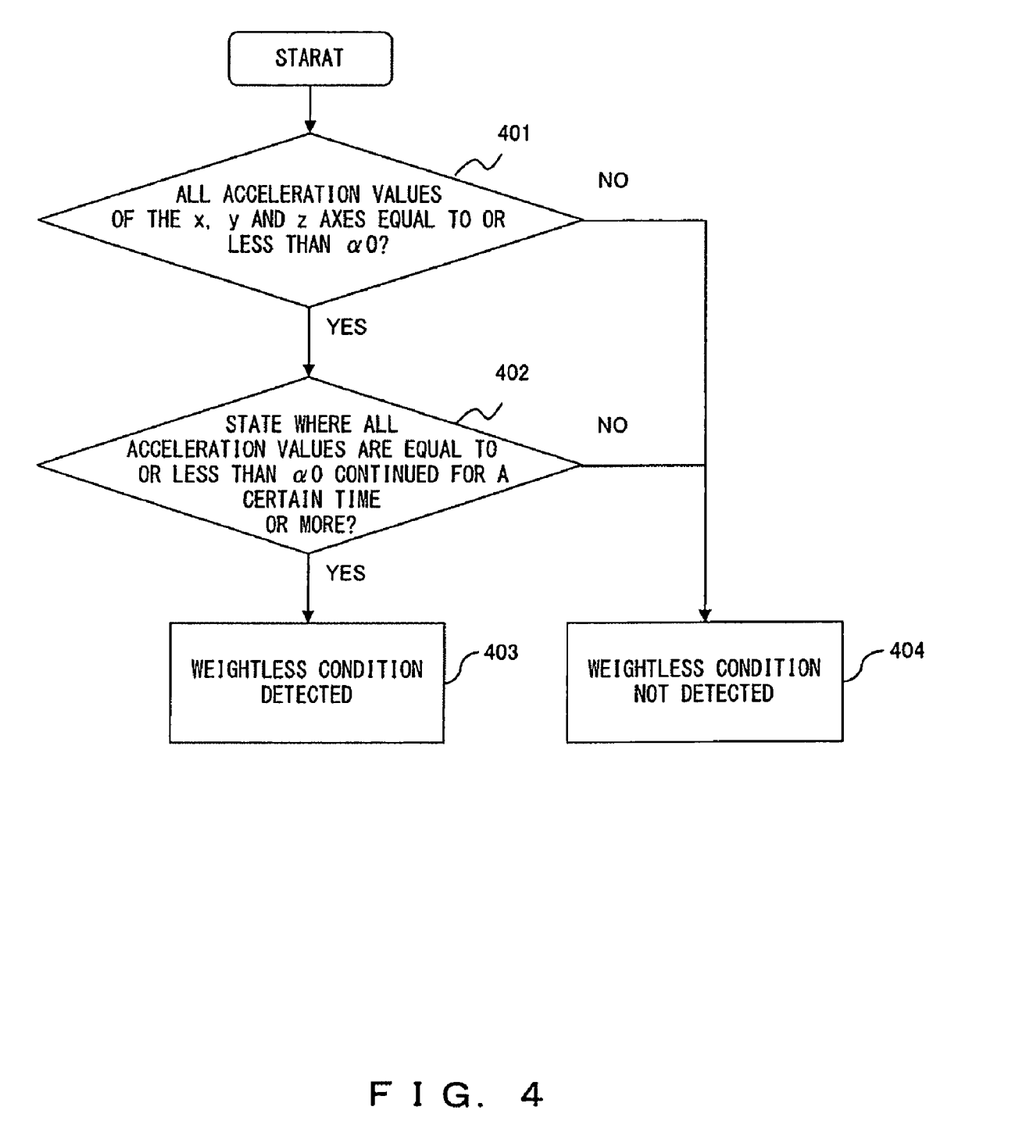
FIG. 4 is the flowchart of a weightless condition detection process.

FIG. 4 is the flowchart of the weightless condition detection process in step 301 illustrated in FIG. 3. Firstly, the process unit 204 compares an acceleration value obtained from the output signal of each of the x, y and z axes of the acceleration sensor 208 with a threshold value $\alpha 0$ (step 401). If at least one of the acceleration values is larger than $\alpha 0$, it is determined that the portable information equipment is not in the weightless condition (step 404).

However, if all of the acceleration values are equal to or less than $\alpha 0$, then the duration time of the state where all the acceleration values are equal to or less than $\alpha 0$ is compared with a certain time T0 on the basis of previous acceleration values (step 402). If the duration time is less than T0, it is determined that the portable information equipment is not in the weightless condition (step 404). If the duration time is equal to or more than T0, it is determined that the portable information equipment is in the weightless condition (step 403).

Figure 5:
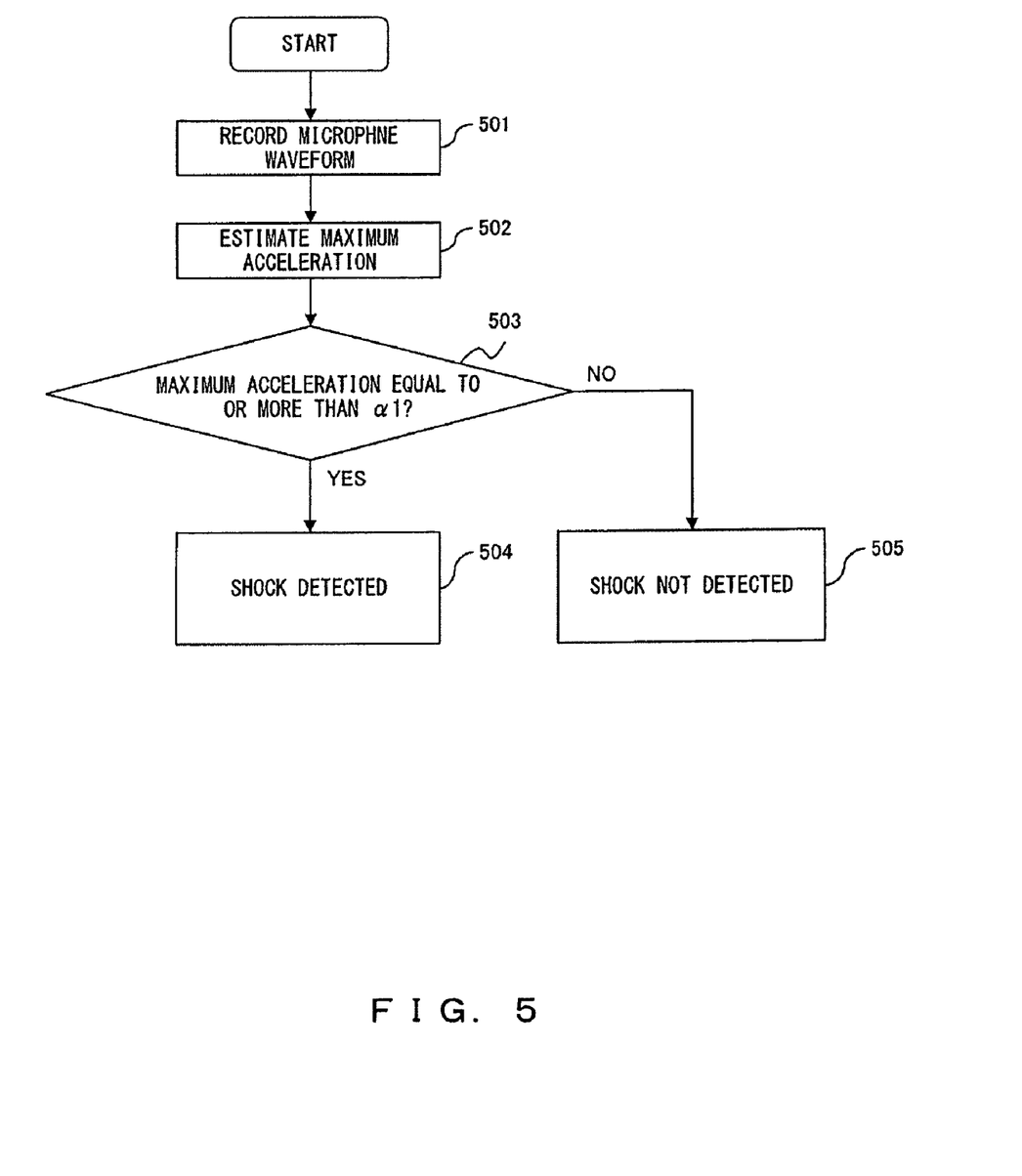
FIG. 5 is the flowchart of a shock detection process.

FIG. 5 is the flowchart of the shock detection process in step 302 illustrated in FIG. 3. Firstly, the process 204 activates the microphone 207 and records audio waveforms inputted for a certain time in the memory 205 (step 501). Then, the maximum acceleration is estimated from the recorded audio waveforms (step 502).

It is considered that an audio waveform in the case where it collides with the floor is fixed to the measurement limit value as in the output signal of a piezoelectric device sensor illustrated in FIG. 13. Therefore, for example, by applying the parabolic approximation illustrated in FIG. 14, the maximum acceleration corresponding to the peak of a parabola can be obtained.

Then, the estimated maximum acceleration is compared with a threshold value $\alpha 1$ (step 503). If the maximum acceleration is less than $\alpha 1$, it is determined that there is no shock (step 505). If the maximum acceleration is equal to or more than $\alpha 1$, it is determined that there is shock (step 504).

Figure 6:
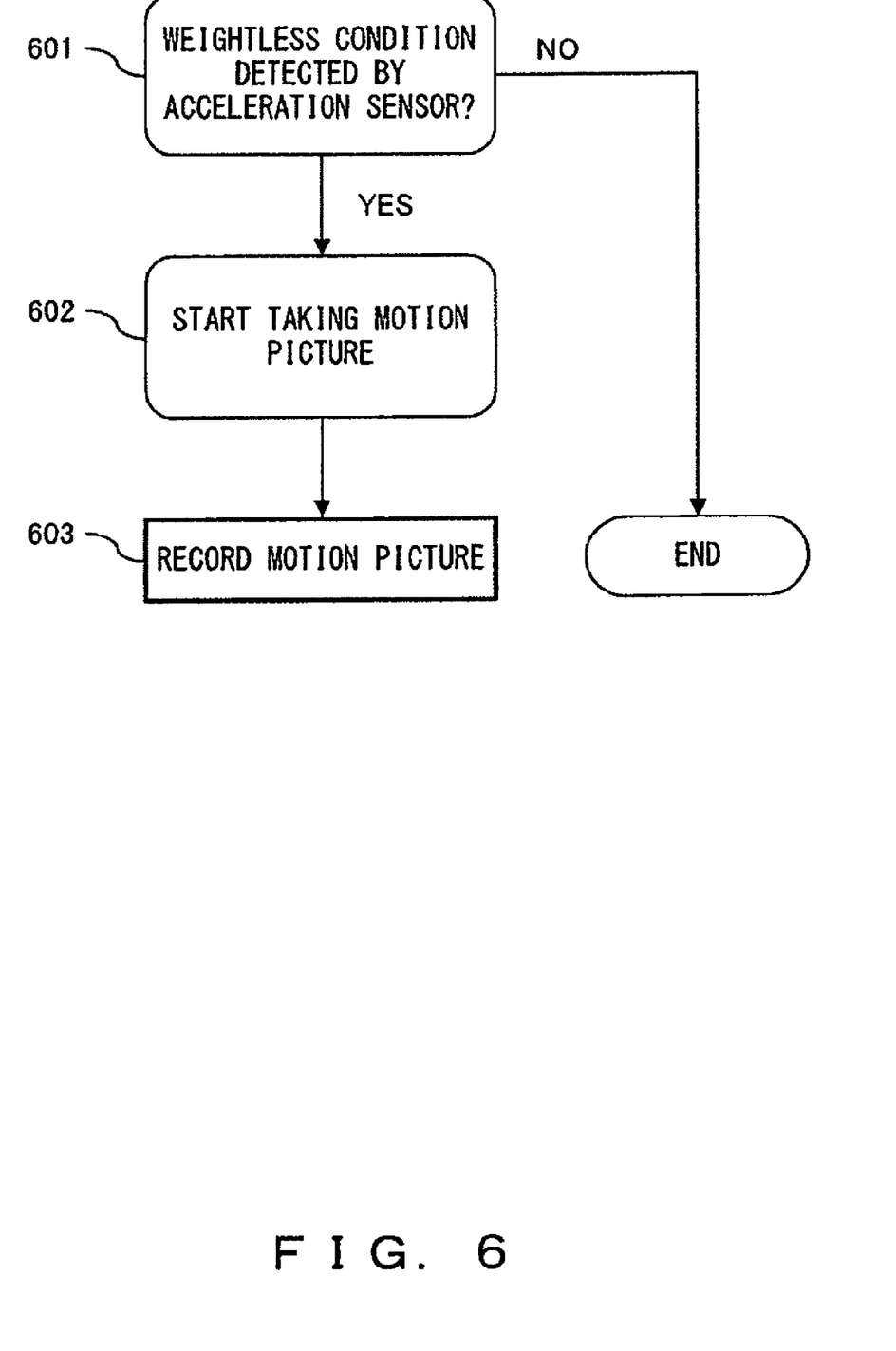
FIG. 6 is the flowchart of the second fall detection process.

FIG. 6 is the flowchart of the second fall detection process using the camera 206 and the acceleration sensor 208. When adopting the second fall detection process, there is no need for portable information equipment to include the microphone 207. Firstly, the process unit 204 determines whether a weightless condition has been detected as in step 301 illustrated in FIG. 3 (step 601). If no weightless condition has been detected, the process is terminated.

If the weightless condition has been detected, the camera 206 is activated, and a motion picture is taken (step 602) and recorded in the memory 205 (step 603). Later, by displaying the recorded motion picture on the screen of the display unit 203, it can be checked whether there has actually been fall collision.

Figure 7:
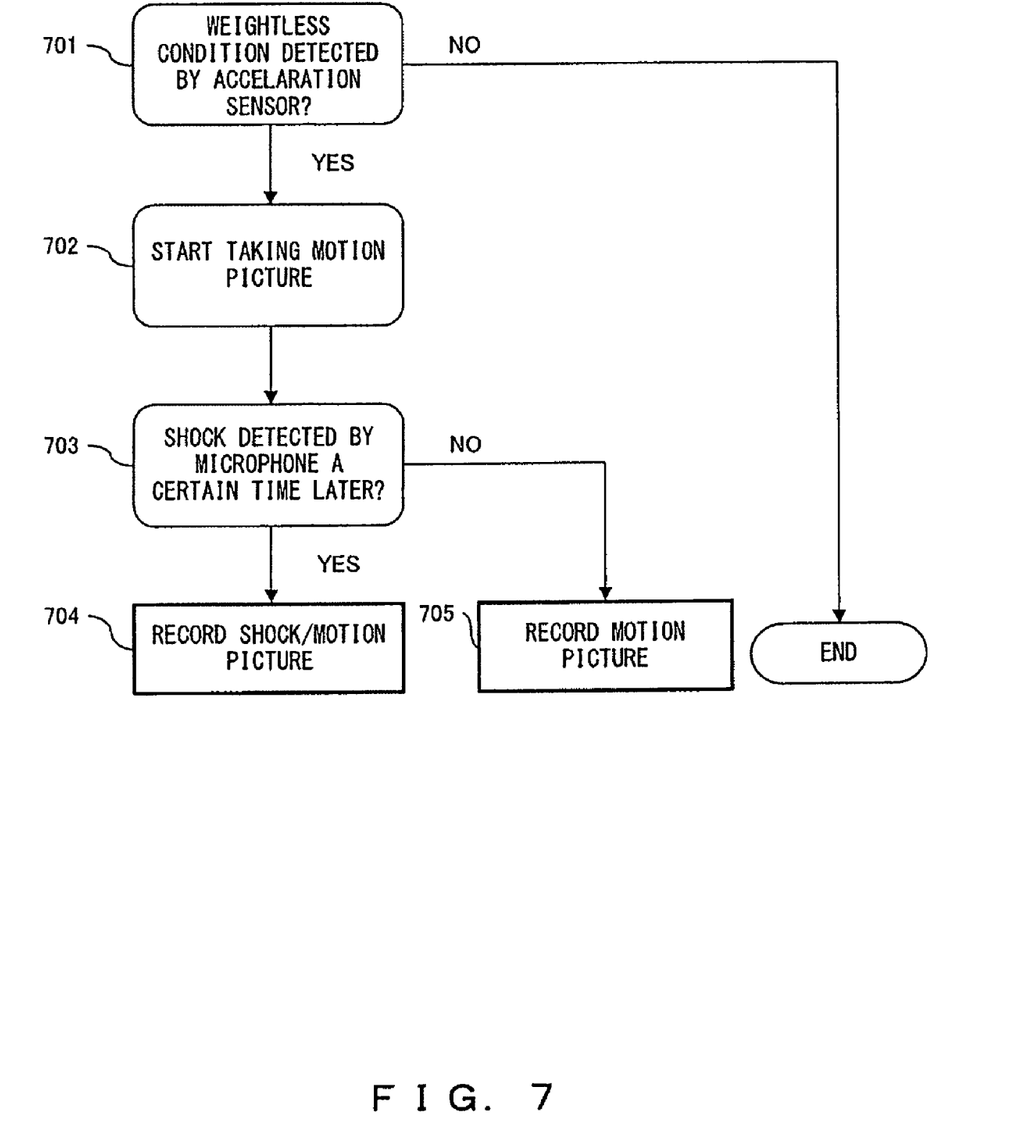
FIG. 7 is the flowchart of the third fall detection process.

FIG. 7 is the flowchart of the third fall detection process using the camera 206, the microphone 207 and the acceleration sensor 208. Processes in steps 701 and 702 are similar to those in steps 601 and 602 illustrated in FIG. 6.

After a motion picture is taken, the process unit 204 determines whether the microphone 207 has detected shock, as in step 302 illustrated in FIG. 3 (step 703). If no shock has been detected, only the motion picture is recorded in the memory (step 705). If shock has been detected, the motion picture and shock detection information are recorded in the memory 205 (step 704). By recording both the motion picture and shock detection information, the existence/non-existence of fall collision can be checked more accurately.

When shock detection information and/or a motion picture are recorded in the memory 205 thus, the process unit 204 transfers the recorded information to the communication unit 202. The communication unit 202 transmits the information together with the identification information of the portable information equipment to a server on a network. Thus, the history of the fall detection of each piece of portable information equipment is accumulated on the server.

According to the above-described fall detection processes, for the acceleration sensor 208, both a highly frequency-responsive piezo-electric device sensor and a low frequency-responsive MEMS sensor can be used. More particularly, if a HEMS sensor is used, portable information equipment becomes inexpensive and its consumption current decreases, compared with when a piezo-electric device sensor is used.

Although the portable information equipment illustrated in FIG. 2 includes only components used to detect fall, it can further include an input unit for user operation or a speaker. For example, in the case of a portable cell-phone and a portable music player, an input unit and a speaker are included.

As described above, when information equipment starts falling, it is in a weightless condition until it collides with the floor or the ground and acceleration detected by an acceleration sensor approaches 0. Therefore, by comparing information about acceleration detected by an acceleration sensor with a threshold value, it can be determined whether it is in the weightless condition.

By recording the acceleration in the weightless condition before collision instead of acceleration by shock at the time of collision, fall can be detected regardless of the frequency responsiveness of an acceleration sensor. Therefore, an acceleration sensor whose frequency responsiveness is low but which is inexpensive can be mounted on information equipment.

All examples and conditional language recited herein are intended for pedagogical purposes to aid the reader in understanding the principles of the invention and the concept contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information equipment, comprising:
an acceleration sensor to detect acceleration values for x, y and z axes of the acceleration sensor;
a storage device to store the detected acceleration values;
an audio input device to obtain audio information; and
a process device to compare each of the detected acceleration values with a threshold value, to determine that the information equipment is in a weightless condition when a state in which all of the detected acceleration values are equal to or less than the threshold value continues for a certain time, to determine that the information equipment is not in the weightless condition when at least one of the detected acceleration values is larger than the threshold value, to record a determination result in the storage device, to activate the audio input device when determining that the information equipment is in the weightless condition, to determine whether there has been shock on the basis of the obtained audio information, and to record shock detection information in the storage device when the process device determines that there has been shock.

2. The information equipment according to claim 1, wherein
the process device estimates a maximum acceleration from an audio waveform indicated by the audio information and determines that there has been shock when the maximum acceleration is equal to or more than a threshold value.

3. The information equipment according to claim 1, further comprising
an imaging device to take a motion picture, wherein
the process device activates the imaging device when determining that the information equipment is in the weightless condition, and records the motion picture in the storage device.

4. A detection method for detecting a weightless condition of an information equipment, comprising:
detecting acceleration values for x, y and z axes of an acceleration sensor in the information equipment;
recording the detected acceleration values;
comparing, by the information equipment, each of the detected acceleration values with a threshold value, determining that the information equipment is in the weightless condition when a state in which all of the detected acceleration values are equal to or less than the threshold value continues for a certain time, and determining that the information equipment is not in the weightless condition when at least one of the detected acceleration values is larger than the threshold value;

obtaining audio information when determining that the information equipment is in the weightless condition;

determining whether there has been shock on the basis of the obtained audio information; and recording shock detection information when the process device determines that there has been shock.

5. An information equipment, comprising:

acceleration sensor means for detecting acceleration values for x, y and z axes of the acceleration sensor means;

storage means for storing the detected acceleration values;

an audio input means for obtaining audio information; and process means for comparing each of the detected acceleration with a threshold value, determining that the information equipment is in a weightless condition when a state in which all of the detected acceleration values are equal to or less than the threshold value continues for a certain time, determining that the information equipment is not in the weightless condition when at least one of the detected acceleration values is larger than the threshold value, recording a determination result in the storage means, activating the audio input means when determining that the information equipment is in the weightless condition, determining whether there has been shock on the basis of the obtained audio information, and recording shock detection information in the storage means when the process means determines that there has been shock.

* * * * *